Figure 1:
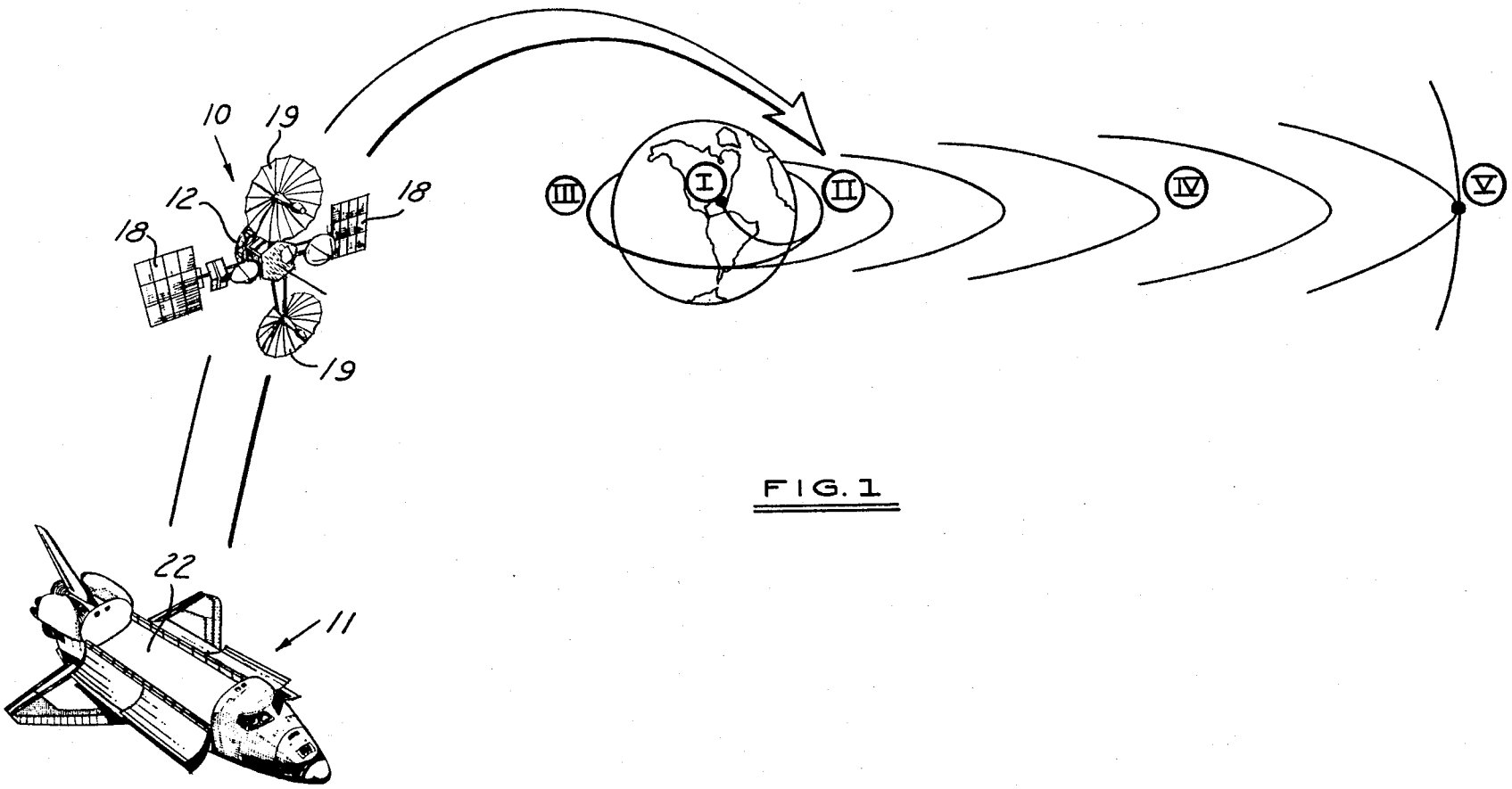
Figure 2:
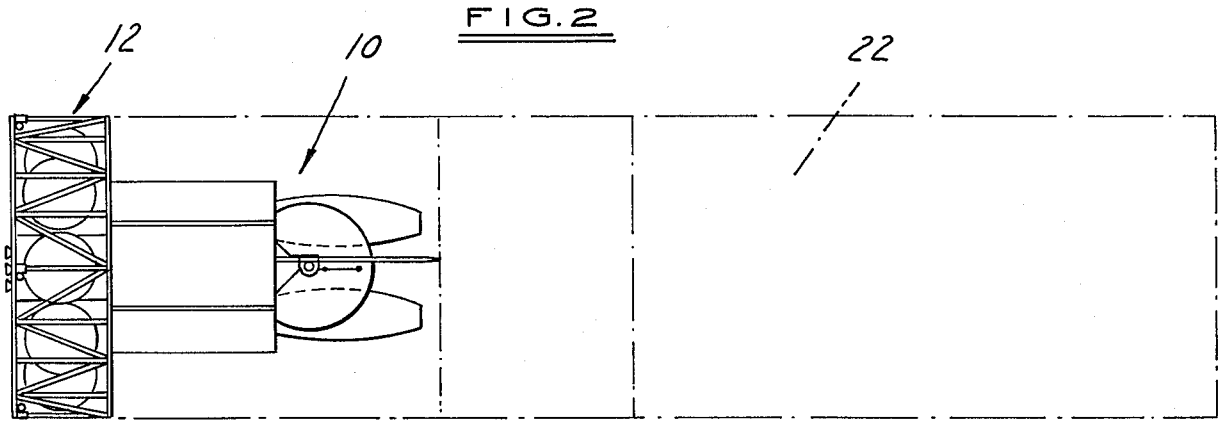
Figure 3:
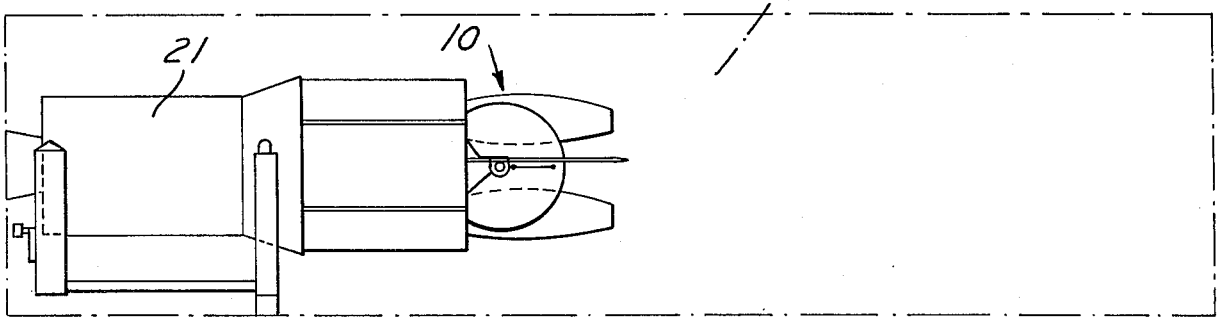
Figure 4:
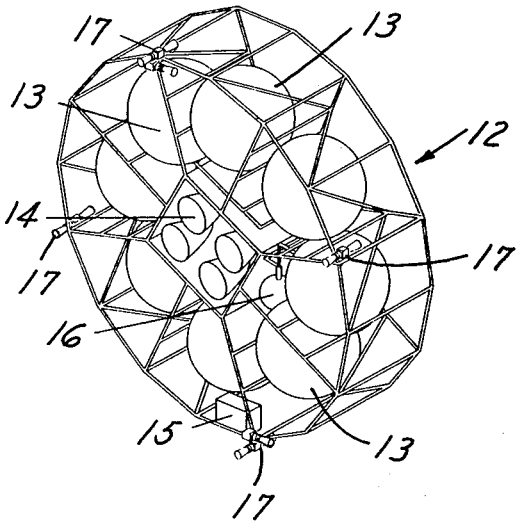
Figure 5:
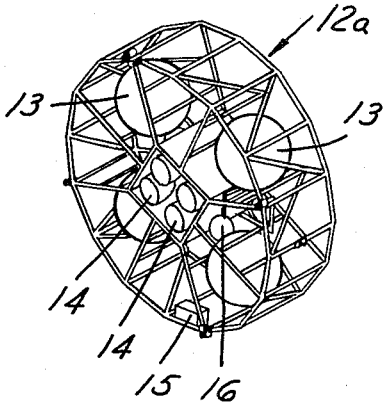
Figure 6:
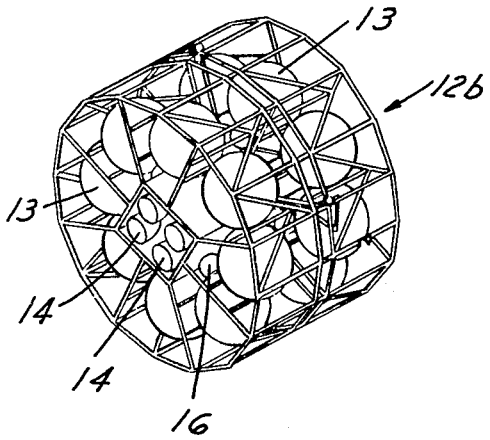
Figure 7:
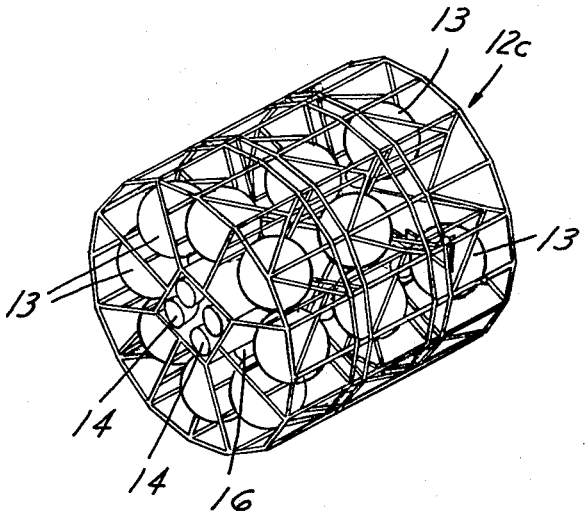

United States Defensive Publication [19] (H) [11] T100,604

Crill et al. [43] May 5, 1981

[54] METHOD OF PLACING A SPACECRAFT INTO FINAL EARTH ORBIT OR EARTH ESCAPE TRAJECTORY

[76] Inventors: Philip D. Crill, 744 La Prenda Rd., Los Altos, Calif. 94022; Shel Kulick, 22364 Ramona Ct., Cupertino, Calif. 95014

[21] Appl. No.: 7,532

[22] Filed: Jan. 29, 1979

Related U.S. Application Data

[63] Continuation of Ser. No. 854,553, Nov. 25, 1977.

[51] Int. Cl.[2] ..... B64G 1/10

[52] U.S. Cl. ..... 244/158 R

[57] ABSTRACT

The method of placing a spacecraft having on-board propulsion devices with self-start capabilities into a series of successively higher transfer orbits to attain from a low earth orbit a final earth orbit or earth escape trajectory. Incremental thrusting impulses limited to a thrusting level at which the acceleration of the spacecraft is more than 0.01 g at beginning of thrusting, but is no more than 0.3 g at termination of thrusting are applied to the spacecraft. The propulsion propellant is ignited upon the near completion of each orbit at the perigee altitude, the latter being substantially common to all of the transfer orbits. The duration of each propellant burn is selectively varied during the transit from one transfer orbit to the next higher orbit and results in the spacecraft being propelled into successively higher energy orbits or trajectories until the desired orbit or escape trajectory is attained. The self-start capability of the spacecraft permits it to be parked in any transfer orbit to permit checkout of its equipment and recapture if a malfunction is detected.

15 Claims, 3 Sheets Drawing,

29 Pages Specification

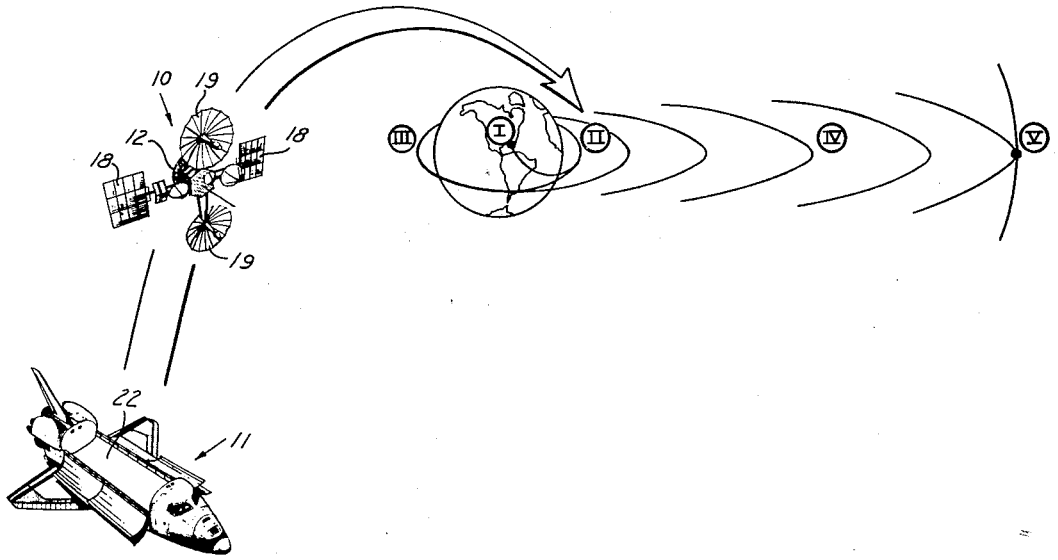

The file of this unexamined application may be inspected and copies thereof may be purchased (849 O.G. 1221, Apr. 9, 1968).